United States Patent
Martín et al.

(10) Patent No.: US 11,269,830 B2
(45) Date of Patent: *Mar. 8, 2022

(54) GENERATING A VENN DIAGRAM USING A COLUMNAR DATABASE MANAGEMENT SYSTEM

(71) Applicant: Open Text Holdings, Inc., San Mateo, CA (US)

(72) Inventors: Carles Bayés Martín, Barcelona (ES); Jesús Malo Poyatos, Barcelona (ES); Marc Rodriguez Sierra, Barcelona (ES); Alejandro Sualdea Pérez, Barcelona (ES)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/854,520

(22) Filed: Apr. 21, 2020

(65) Prior Publication Data

US 2020/0250162 A1 Aug. 6, 2020

Related U.S. Application Data

(63) Continuation of application No. 15/595,448, filed on May 15, 2017, now Pat. No. 10,642,806, which is a (Continued)

(51) Int. Cl.
*G06F 16/22* (2019.01)
*G06F 16/248* (2019.01)
(Continued)

(52) U.S. Cl.
CPC .......... *G06F 16/221* (2019.01); *G06F 16/248* (2019.01); *G06F 16/2455* (2019.01); *G06F 16/24578* (2019.01)

(58) Field of Classification Search
CPC ...................................................... G06F 16/221
(Continued)

(56) References Cited

U.S. PATENT DOCUMENTS 6,041,053 A 3/2000 Douceur
6,941,318 B1 9/2005 Tamayo et al.
(Continued)

OTHER PUBLICATIONS

Office Action for U.S. Appl. No. 14/307,711, dated May 13, 2016, 16 pgs.
(Continued)

*Primary Examiner* — Syling Yen
(74) *Attorney, Agent, or Firm* — Sprinkle IP Law Group

(57) ABSTRACT

Venn diagrams are computed for a given plurality of input sets. The process of computing the Venn diagrams is executed on columnar database systems for efficient execution. The computation of various subsets of the Venn diagrams is performed by determining subsets of various combinations of the input sets and computing set differences of the intersection sets. The process orders the execution of various steps of computing the subsets for the Venn diagram in an order that reduces the number of times an input set is loaded. Information describing various subsets of a Venn diagram is used to render the Venn diagram for display, for example, on a client device.

20 Claims, 9 Drawing Sheets

Related U.S. Application Data continuation of application No. 14/308,971, filed on Jun. 19, 2014, now Pat. No. 9,679,000.

(60) Provisional application No. 61/837,272, filed on Jun. 20, 2013.

(51) Int. Cl.
    *G06F 16/2455*     (2019.01)
    *G06F 16/2457*     (2019.01)

(58) Field of Classification Search
    USPC .......................................................... 707/723
    See application file for complete search history.

(56) References Cited

U.S. PATENT DOCUMENTS

| | | | |
|---|---|---|---|
| 7,031,978 B1 | 4/2006 | Hornick et al. | |
| 7,346,601 B2 | 3/2008 | Chaudhuri | |
| 7,421,660 B2 | 9/2008 | Charnock et al. | |
| 7,945,850 B2 | 5/2011 | Machalek | |
| 9,081,849 B2 | 7/2015 | Cushing | |
| 9,094,258 B2 | 7/2015 | Broda | |
| 9,183,529 B2 | 11/2015 | Gluzman | |
| 9,218,373 B2 | 12/2015 | Saito | |
| 9,405,821 B1 | 8/2016 | Bessis | |
| 9,600,539 B2 | 3/2017 | Martin et al. | |
| 9,607,019 B1 | 3/2017 | Swift | |
| 9,679,000 B2 | 6/2017 | Martin et al. | |
| 9,798,783 B2 | 10/2017 | Martin et al. | |
| 10,282,355 B2 | 5/2019 | Martin et al. | |
| 10,606,852 B2 | 3/2020 | Martin et al. | |
| 10,642,806 B2 | 5/2020 | Martin et al. | |
| 10,970,287 B2 | 4/2021 | Martin et al. | |
| 2002/0013786 A1 | 1/2002 | Machalek | |
| 2003/0158842 A1 | 8/2003 | Levy | |
| 2004/0153456 A1 | 8/2004 | Charnock et al. | |
| 2007/0088731 A1 | 4/2007 | Chant | |
| 2007/0174252 A1 | 7/2007 | Rawlings et al. | |
| 2009/0019029 A1 | 1/2009 | Tommaney | |
| 2009/0254532 A1 | 10/2009 | Yang et al. | |
| 2010/0010986 A1* | 1/2010 | Icho ........................ | G06F 16/44 |
| | | | 707/E17.014 |
| 2010/0088309 A1 | 4/2010 | Petculescu et al. | |
| 2010/0150342 A1* | 6/2010 | Richards ............... | H04L 9/0833 |
| | | | 380/30 |
| 2012/0084278 A1 | 4/2012 | Franke | |
| 2012/0310874 A1* | 12/2012 | Dantressangle ...... | G06F 16/221 |
| | | | 707/600 |
| 2013/0073513 A1 | 3/2013 | Kemper | |
| 2013/0232176 A1 | 9/2013 | Plattner | |
| 2013/0342542 A1 | 12/2013 | Brant et al. | |
| 2014/0012881 A1 | 1/2014 | Roesch | |
| 2014/0040306 A1 | 2/2014 | Gluzman Peregrine | |
| 2014/0188820 A1 | 7/2014 | Pederson | |
| 2014/0188924 A1 | 7/2014 | Ma | |
| 2017/0249343 A1 | 8/2017 | Martin et al. | |
| 2018/0011909 A1 | 1/2018 | Martin et al. | |
| 2019/0228011 A1 | 7/2019 | Martin et al. | |
| 2020/0226134 A1 | 7/2020 | Martin | |
| 2021/0182286 A1 | 6/2021 | Martin et al. | |

OTHER PUBLICATIONS

Office Action for U.S. Appl. No. 14/308,971, dated May 18, 2016, 22 pgs.

Office Action for U.S. Appl. No. 14/303,581, dated Jul. 14, 2016, 23 pgs.

Office Action for U.S. Appl. No. 14/303,581, dated Oct. 25, 2016, 31 pgs.

Office Action for U.S. Appl. No. 14/303,581, dated Feb. 16, 2017, 23 pgs.

Office Action for U.S. Appl. No. 15/430,223, dated Oct. 1, 2018, 14 pgs.

Office Action for U.S. Appl. No. 15/595,448, dated Jan. 2, 2019, 26 pgs.

Office Action for U.S. Appl. No. 15/595,448, dated May 10, 2019, 31 pgs.

Notice of Allowance for U.S. Appl. No. 15/714,358, dated Nov. 19, 2019, 6 pgs.

Notice of Allowance for U.S. Appl. No. 15/595,448, dated Jan. 15, 2020, 2 pages.

Notice of Allowance for U.S. Appl. No. 16/370,122, dated Nov. 30, 2020, 8 pgs.

Office Action for U.S. Appl. No. 16/793,856, dated Sep. 14, 2021, 14 pgs.

\* cited by examiner

| OUTLOOK | TEMPERATURE | WINDY | A (WINDY=FALSE) | B (OUTLOOK=RAIN OR OUTLOOK=SUNNY) | C (TEMPERATURE >=72) |
|---|---|---|---|---|---|
| SUNNY | 85 | FALSE | FALSE | TRUE | TRUE |
| SUNNY | 80 | TRUE | TRUE | TRUE | TRUE |
| OVERCAST | 83 | FALSE | FALSE | FALSE | TRUE |
| RAIN | 70 | FALSE | FALSE | TRUE | FALSE |
| RAIN | 68 | FALSE | FALSE | TRUE | FALSE |
| RAIN | 65 | TRUE | TRUE | TRUE | FALSE |
| OVERCAST | 64 | TRUE | FALSE | FALSE | FALSE |
| SUNNY | 72 | FALSE | FALSE | TRUE | TRUE |
| SUNNY | 69 | FALSE | FALSE | TRUE | FALSE |
| RAIN | 75 | FALSE | FALSE | TRUE | TRUE |
| SUNNY | 75 | TRUE | TRUE | TRUE | TRUE |
| OVERCAST | 72 | TRUE | FALSE | FALSE | TRUE |
| OVERCAST | 81 | FALSE | FALSE | FALSE | TRUE |
| RAIN | 71 | TRUE | TRUE | TRUE | FALSE |

| COMBINATION (MASK) | A | B | C | PARTIAL RESULT | FINAL RESULT | NUMBER OF TRUES |
|---|---|---|---|---|---|---|
| 0 | 0 | 0 | 0 | | | 0 |
| 1 | 0 | 0 | 1 | | | 1 |
| 2 | 0 | 1 | 0 | | | 1 |
| 3 | 0 | 1 | 1 | | | 2 |
| 4 | 1 | 0 | 0 | | | 1 |
| 5 | 1 | 0 | 1 | | | 2 |
| 6 | 1 | 1 | 0 | | | 2 |
| 7 | 1 | 1 | 1 | | | 3 |

| COMBINATION (MASK) | A | B | C | PARTIAL RESULT | FINAL RESULT | NUMBER OF TRUES |
|---|---|---|---|---|---|---|
| 0 | 0 | 0 | 0 | | | 0 |
| 1 | 0 | 0 | 1 | 8 | | 1 |
| 2 | 0 | 1 | 0 | | | 1 |
| 4 | 1 | 0 | 0 | | | 1 |
| 3 | 0 | 1 | 1 | | | 2 |
| 5 | 1 | 0 | 1 | | | 2 |
| 6 | 1 | 1 | 0 | | | 2 |
| 7 | 1 | 1 | 1 | | | 3 |

| COMBINATION (MASK) | A | B | C | PARTIAL RESULT | FINAL RESULT | NUMBER OF TRUES |
|---|---|---|---|---|---|---|
| 0 | 0 | 0 | 0 | | | 0 |
| 1 | 0 | 0 | 1 | 8 | | 1 |
| 2 | 0 | 1 | 0 | | | 1 |
| 4 | 1 | 0 | 0 | | | 1 |
| 3 | 0 | 1 | 1 | 6 | | 2 |
| 5 | 1 | 0 | 1 | | | 2 |
| 6 | 1 | 1 | 0 | | | 2 |
| 7 | 1 | 1 | 1 | | | 3 |

| COMBINATION (MASK) | A | B | C | PARTIAL RESULT | FINAL RESULT | NUMBER OF TRUES |
|---|---|---|---|---|---|---|
| 0 | 0 | 0 | 0 | | | 0 |
| 1 | 0 | 0 | 1 | 8 | | 1 |
| 2 | 0 | 1 | 0 | | | 1 |
| 4 | 1 | 0 | 0 | | | 1 |
| 3 | 0 | 1 | 1 | 6 | | 2 |
| 5 | 1 | 0 | 1 | | | 2 |
| 6 | 1 | 1 | 0 | | | 2 |
| 7 | 1 | 1 | 1 | 3 | | 3 |

| COMBINATION (MASK) | A | B | C | PARTIAL RESULT | FINAL RESULT | NUMBER OF TRUES |
|---|---|---|---|---|---|---|
| 0 | 0 | 0 | 0 |  |  | 0 |
| 1 | 0 | 0 | 1 | 8 |  | 1 |
| 2 | 0 | 1 | 0 | 10 |  | 1 |
| 4 | 1 | 0 | 0 |  |  | 1 |
| 3 | 0 | 1 | 1 | 6 |  | 2 |
| 5 | 1 | 0 | 1 |  |  | 2 |
| 6 | 1 | 1 | 0 |  |  | 2 |
| 7 | 1 | 1 | 1 | 3 |  | 3 |

| COMBINATION (MASK) | A | B | C | PARTIAL RESULT | FINAL RESULT | NUMBER OF TRUES |
|---|---|---|---|---|---|---|
| 0 | 0 | 0 | 0 |  |  | 0 |
| 1 | 0 | 0 | 1 | 8 |  | 1 |
| 2 | 0 | 1 | 0 | 10 |  | 1 |
| 4 | 1 | 0 | 0 | 8 |  | 1 |
| 3 | 0 | 1 | 1 | 6 |  | 2 |
| 5 | 1 | 0 | 1 | 5 |  | 2 |
| 6 | 1 | 1 | 0 | 6 |  | 2 |
| 7 | 1 | 1 | 1 | 3 |  | 3 |

| COMBINATION (MASK) | A | B | C | PARTIAL RESULT | FINAL RESULT | FORMULA |
|---|---|---|---|---|---|---|
| 0 | 0 | 0 | 0 | | | |
| 1 | 0 | 0 | 1 | 8 | 8-3-2-3=0 | (partial1-final3-final5-final7) |
| 2 | 0 | 1 | 0 | 10 | 10-3-3-3=1 | (partial2-final3-final6-final7) |
| 4 | 1 | 0 | 0 | 8 | 8-2-3-3=0 | (partial4-final5-final6-final7) |
| 3 | 0 | 1 | 1 | 6 | 6-3=3 | (partial3-final7) |
| 5 | 1 | 0 | 1 | 5 | 5-3=2 | (partial5-final7) |
| 6 | 1 | 1 | 0 | 6 | 6-3=3 | (partial6-final7) |
| 7 | 1 | 1 | 1 | 3 | 3 | (partial7) |

| COMBINATION (MASK) | A | B | C | ELEMENTS IN THE SET | NUMBER OF TRUES |
|---|---|---|---|---|---|
| 0 | 0 | 0 | 0 | * | 0 |
| 1 | 0 | 0 | 1 | 0 | 1 |
| 2 | 0 | 1 | 0 | 1 | 1 |
| 3 | 0 | 1 | 1 | 3 | 2 |
| 4 | 1 | 0 | 0 | 0 | 1 |
| 5 | 1 | 0 | 1 | 2 | 2 |
| 6 | 1 | 1 | 0 | 3 | 2 |
| 7 | 1 | 1 | 1 | 3 | 3 |

FIG. 4I

GENERATING A VENN DIAGRAM USING A COLUMNAR DATABASE MANAGEMENT SYSTEM

CROSS-REFERENCE TO RELATED APPLICATIONS

This application is a continuation of, and claims a benefit of priority under 35 U.S.C. § 120 from, U.S. patent application Ser. No. 15/595,448, filed May 15, 2017, entitled "GENERATING A VENN DIAGRAM USING A COLUMNAR DATABASE MANAGEMENT SYSTEM," which is a continuation of, and claims a benefit of priority under 35 U.S.C. § 120 from, U.S. patent application Ser. No. 14/308,971, filed Jun. 19, 2014, issued as U.S. Pat. No. 9,679,000, entitled "GENERATING A VENN DIAGRAM USING A COLUMNAR DATABASE MANAGEMENT SYSTEM," which claims a benefit of priority from U.S. Provisional Application No. 61/837,272, filed Jun. 20, 2013. All applications listed in the paragraph are incorporated herein by reference in their entireties.

TECHNICAL FIELD

This invention relates generally to data mining, and particularly to generating a Venn diagram using a columnar database management system.

DESCRIPTION OF THE RELATED ART

Data mining algorithms are often employed by various systems that process data. Data is often represented as sets of various types of entities, for example, products, employees, users of a system, transactions performed by an online system and so on. Data mining systems perform operations on these sets of data, for example, set union, set intersection, set difference, and so on. One operation performed by data mining systems is generation of a Venn diagram of two or more sets of data.

Generating a Venn diagram in turn requires performing various other set operations, for example, set intersection, set difference and so on. Conventional techniques for generating Venn diagrams perform these operations inefficiently. This is so because conventional techniques load the same data multiple times for performing various steps of the Venn diagram generation. As a consequence, generating a Venn diagram is often inefficient and consumes more computing resources than needed.

SUMMARY

Embodiments of the invention generate Venn diagrams. A Venn diagram shows information describing subsets of data of two or more input sets. A data mining system receives a request for determining subsets of the Venn diagram. The request identifies the plurality of input sets for the Venn diagram. The data mining system generates intersection sets, each intersection set based on a combination of input sets. The data mining system determines the intersection sets in an order that efficiently utilizes data of input sets that has been previously loaded.

The data mining system loads a first combination of input sets for determining a first intersection set. The data mining system selects a second intersection set for processing next such that the combination of input sets for the second intersection set includes the first combination of input sets. For example, the second combination can be a superset of the first combination of input sets. The data mining system loads the input sets of the second combination that are not included in the first combination. The data mining system uses the loaded input sets to determine the second intersection set. The data mining system determines the subsets for the Venn diagram based on the intersection sets.

In an embodiment, the data mining system builds a truth table representing combinations of input sets as binary values. The positions of bits in a binary value from the truth table correspond to input sets and the value of each bit determines whether the input set corresponding to that position is included in the combination. The data mining system uses the truth table to determine the order in which steps for generating the Venn diagram are executed. For example, the data mining system ranks the combinations of sets based on the number of ones in each binary value of the truth table and uses the ranking to select the second intersection set after the first intersection set is determined.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

FIGS. 4A-4J illustrate an example process for generating a Venn diagram by a columnar database management system, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

Figure 1A:
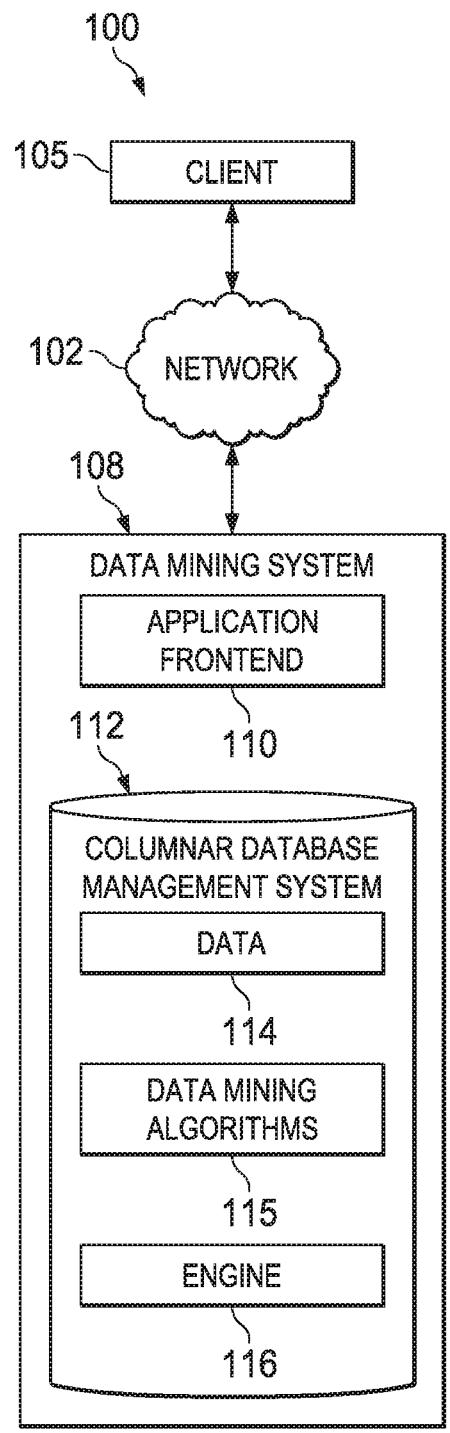
FIG. 1A is a high-level diagram illustrating a system environment for generating a Venn diagram using a columnar database management system, according to one embodiment

FIG. 1A illustrates an example of a system environment 100 for generating a Venn diagram based on two or more input sets of data. As shown in FIG. 1A, a client 105 is in communication with a data mining system 108 over a network 102. The client 105 is a computing device usable by a user to initiate data mining requests. The data mining requests may indicate to the data mining system 108 to perform one or more data mining algorithms on data stored by the data mining system 108. In one embodiment, the data mining request indicates that a Venn diagram be generated based on two or more input sets of data specified by the data mining request. In one aspect, the client 105 may be a computing device, such as a desktop computer, a laptop computer, a workstation, a server computer, a mobile phone, a tablet device, etc.

As shown in FIG. 1A, the data mining system 108 includes, among other components, an application frontend 110 and a columnar database management system 112. The application frontend 110 may be a software application configured to receive data mining requests from the client 105 and/or provide data mining results to the client device 105. In one embodiment, the application frontend 110 may forward or route data mining requests to the columnar database management system 112 for data processing. The application frontend 110 may additionally receive data mining results from the columnar database management system 112 for transmission to a client 105.

The columnar database management system 112 is a system configured to store data in column oriented fashion in contrast with databases that store data in row oriented fashion. The columnar database management system 112 stores data in column oriented fashion so as to perform computations of aggregates over columns of data efficiently compared to databases that store data in row oriented fashion. For example, if data is stored in row oriented fashion, loading a column of data requires loading of data belonging to other columns as well. However, the columnar database management system 112 stores in column oriented fashion and loads data of a column for processing without loading data belonging to other columns. As a result the columnar database management system 112 performs processing of a column of data more efficiently than databases that represent data in row oriented fashion. As shown in FIG. 1A, the columnar database management system 112 includes data 114, data mining algorithms 115, and a database engine 116. In one aspect, data 114 includes various columns of data, where each column represents a separate logical set.

The database engine 116 is a logical entity configured to create, read, update and delete data stored by the columnar data management system 112. In one embodiment, the database engine 116 is configured to perform data mining using the data mining algorithms 115 and the data 114. In one embodiment, the data mining algorithms 115 include a Venn diagram process for generating Venn diagrams. Generating a Venn diagram comprises calculation of various subsets of data displayed by a Venn diagram.

In the embodiment, responsive to receiving a data mining request to generate a Venn diagram from the client 105 or forwarded by the application frontend 110, the data mining system 108 performs various steps to process the request and generate a Venn diagram. In particular, the data mining system 108 generates a truth table responsive to a request to generate a Venn diagram. Furthermore, the data mining system 108 performs various arithmetic and logical operations using the truth table to generate the Venn diagram. Specifically, the database engine 116 performs calculations for those sets of data involved in the Venn diagram without performing additional operations, such as negation, union, or exclusion when the operations are not needed.

The interactions between the client devices 105 and the data mining system 108 are typically performed via a network 102, for example, via the internet. The network 102 enables communications between the client device 105 and the data mining system 108. In one embodiment, the network 108 uses standard communications technologies and/or protocols. The data exchanged over the network 108 can be represented using technologies and/or formats including the hypertext markup language (HTML), the extensible markup language (XML), etc. In another embodiment, the entities can use custom and/or dedicated data communications technologies instead of, or in addition to, the ones described above.

Figure 1B:
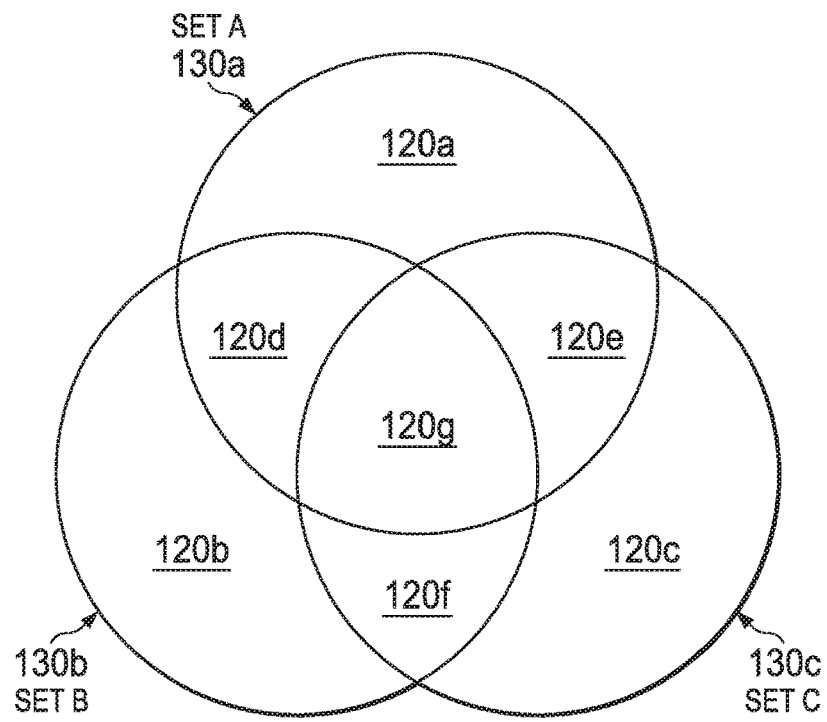
FIG. 1B is a diagram showing a Venn diagram.

FIG. 1B is a diagram showing a Venn diagram. FIG. 1B and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

The Venn diagram shows various relations between sets. The relations may be shown pictorially as overlapping geometric shapes, for example, overlapping circles, overlapping rectangles, or other types of shapes. For example, as shown in FIG. 1B, the data mining system 108 receives information identifying (i.e., specifying or defining) input sets 130a, 130b, and 130c (corresponding to sets A, B, and C respectively). For example, the input sets 130a, 130b, and 130c may be stored as columns in the columnar database management system 112, and the request identifies which columns store the input sets and what conditions they have to meet. The data mining system 108 determines subsets 120 of these sets corresponding to the various regions shown in FIG. 1B.

For example, region 120a corresponds to all elements of set 130a that do not overlap with any other set. Region 120b corresponds to all elements of set 130b that do not overlap with any other set and region 120c corresponds to all elements of set 130c that do not overlap with any other set. Region 120g corresponds to intersection of all three sets 130a, 130b, and 130c. Region 120d corresponds to intersection of sets 130a and 130b, minus the elements of region 120g. Region 120e corresponds to intersection of sets 130a and 130c, minus the elements of region 120g. Region 120f corresponds to intersection of sets 130b and 130c, minus the elements of region 120g.

Given the various subsets corresponding to a Venn diagram, the data mining system 108 can determine other relations between the sets. For example, the union of 120d and 120g can be determined to compute the intersection of sets 130a and 130b. Similarly, the union of 120e and 120g can be determined to compute the intersection of sets 130a and 130c. Similarly, the union of 120f and 120g can be determined to compute the intersection of sets 130b and 130c.

Computer Architecture

Figure 2:
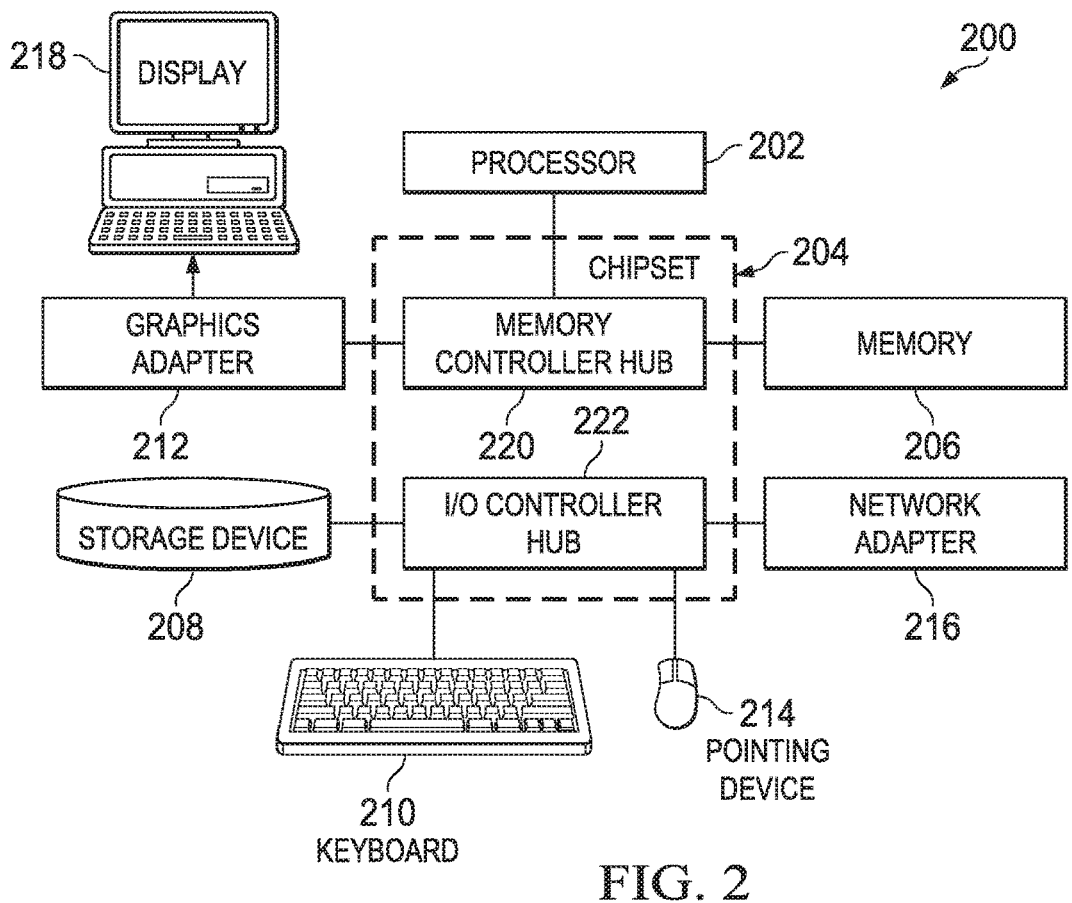
FIG. 2 is a high-level block diagram of a computer system for data mining, according to one embodiment.

FIG. 2 is a high-level block diagram of a computer 200 for use as the client 105, data mining system 108, application frontend 110, or columnar database management system 112 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. In an embodiment, instructions for performing various steps of the process of generating Venn diagram are stored on a storage device 208. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 102.

A computer 200 can have different and/or other components than those shown in FIG. 2. In addition, the computer 200 can lack certain illustrated components. In one embodiment, a computer 200 acting as the data mining system 108 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

The computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Overall Process

The process of generating Venn diagrams using columnar databases orders the various steps of the computation such that data loaded for performing a step is reused by subsequent steps if possible. The data mining system 108 receives information identifying a plurality of input sets of data for generating a Venn diagram. In an embodiment, the columnar database management system 112 stores the input sets in a columnar format that stores data of a column on a storage device. The data mining system 108 determines intersections of various combinations of the input sets. For example, if the input data sets are 130a, 130b, and 130c, the various combinations of intersections are (130a ∩ 130b), (130b ∩ 130c), (130a ∩ 130c), and (130a ∩ 130b ∩ 130c).

The data mining system 108 orders the computations of the intersections of sets such that the data used for determining an intersection of a combination is used for determining the intersection of the next combination. For example, if data for set 130a is loaded, the intersection (130a ∩ 130b) may be determined next since this intersection uses the data of set 130a that is already loaded. Once the intersection of data set (130a ∩ 130b) is determined, the data mining system 108 may determine the intersection of (130a ∩ 130b ∩ 130c) since performing this operation requires intersection set (130a ∩ 130b) that is already loaded.

The data mining system 108 determines the various subsets of the Venn diagram by computing appropriate set differences of the intersection sets or subsets of Venn diagram previously computed. For example, the subset 120d of the Venn diagram is determined by computing the set difference of intersection set (130a ∩ 130b) and the intersection set (130a ∩ 130b ∩ 130c). Similarly, the subset 120e of the Venn diagram is determined by computing the set difference of intersection set (130a ∩ 130c) and the intersection set (130a ∩ 130b ∩ 130c). Similarly, the subset 120f of the Venn diagram is determined by computing the set difference of intersection set (130b ∩ 130c) and the intersection set (130a ∩ 130b ∩ 130c).

Furthermore, subset 120a is computed by computing the set difference of set 130a and a union of subsets 120d, 120e, and 120g. Subset 120b is computed by computing the set difference of set 130b and a union of subsets 120d, 120f, and 120g. Subset 120c is computed by computing the set difference of set 130c and a union of subsets 120e, 120f, and 120g.

Figure 3:
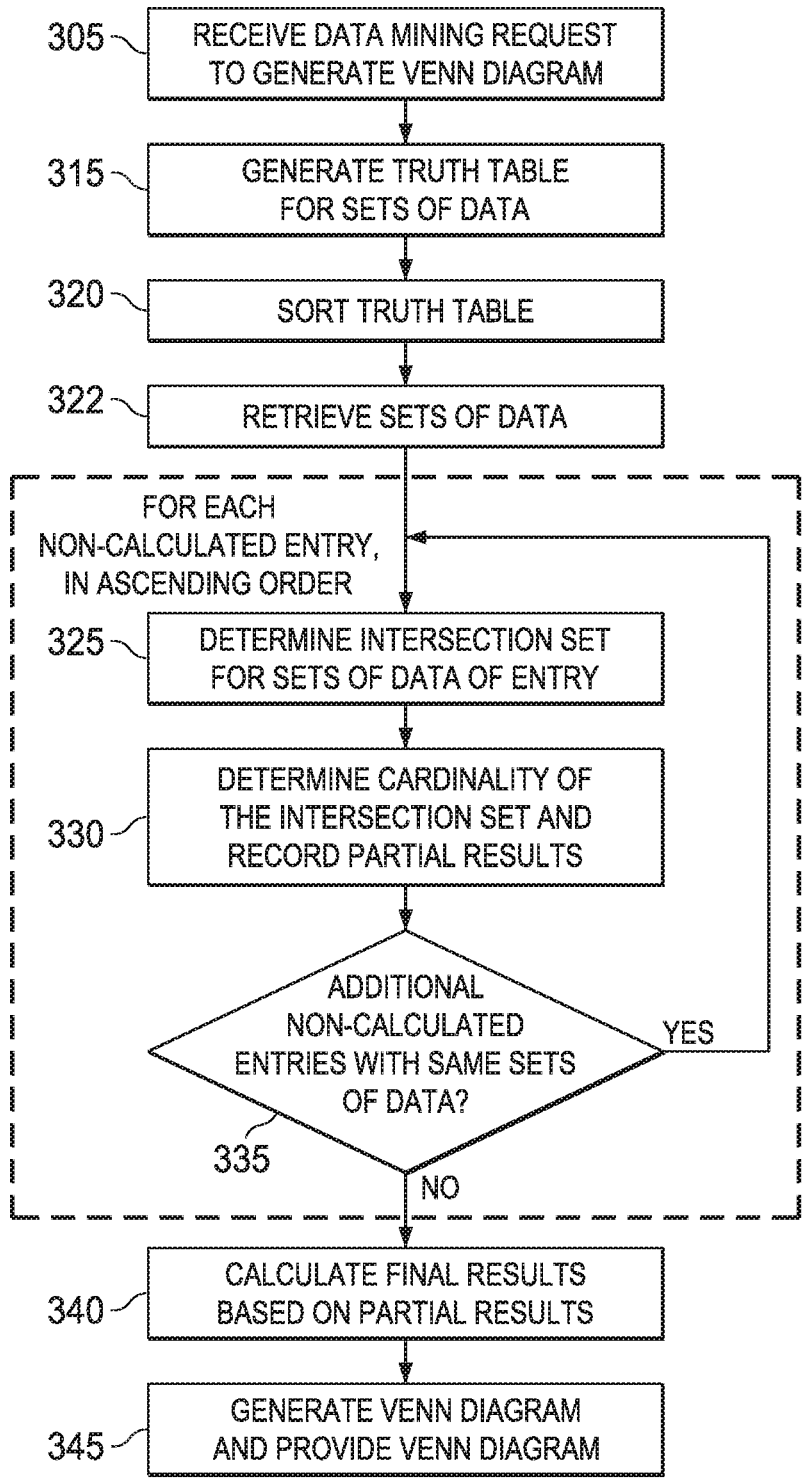
FIG. 3 is a flow chart illustrating a method for generating a Venn diagram by a columnar database management system, according to one embodiment.

FIG. 3 is a flowchart illustrating a method for generating a Venn diagram according to one embodiment. Other embodiments can perform the steps of the method in different orders and can include different, additional and/or fewer steps. The method shown in FIG. 3 can be performed by the columnar database management system 112.

In the one embodiment, the columnar database management system 112 directly receives 305 a data mining request from the client 105 or receives a forwarded data mining request from the application frontend 110. The data mining request received 305 requests generation of a Venn diagram. The data mining request identifies the input sets of data for the Venn diagram. For example, the data mining request may identify the sets of data A, B, and C. For illustration purposes, the following description assumes that the set of data A includes 8 elements, the set of data B includes 10 elements, and the set of data C includes 8 elements. FIG. 4A shows the elements included in the example sets of data A, B, and C.

In one aspect, the data mining request can be encapsulated in a suitable message format. For example the data mining request may be encapsulated in a suitable text format, such as XML, or in any other format. In some embodiments, the data mining request is received by the columnar database management system 112 via one or more suitable network transfer protocols. In other embodiments, the data mining request is received via an application programming interface (API) call, through receipt of a file containing the data mining request, or via an interactive console. It will be appreciated, however, that other ways of receiving the data mining request may be used.

After receiving the data mining request, the database engine 116 generates 315 a truth table based on the sets of data indicated by the data mining request. In one embodiment, the generated truth table includes multiple entries, where each entry corresponds to a combination of the input sets of data. Each entry of the truth table is associated with a binary value. The positions of bits in a binary value correspond to input sets and the value of a bit determines whether the input set corresponding to the position of the bit is included in the combination represented by the binary value.

For example, counting from the least significant bit to the most significant bit, the first position of bits may correspond to set C, the second position may correspond to set B, and the third position may correspond to set A. Furthermore, if a bit value is 1, the corresponding set is included in the combination and if the bit value is 0, the corresponding set is not included in the combination. A value 1 in the binary representation corresponds to value "true" and value 0 corresponds to value "false." However, a different encoding scheme can be used, for example, an encoding scheme in which value 1 in the binary representation corresponds to value "false" and value 0 corresponds to value "true."

The data mining system 108 ranks the combinations of sets based on the number of ones in each binary value. This ranking is distinct from a ranking based on the numeric value of the binary number. For example, even though binary number 1000 is greater that binary number 011, the number of ones in 011 is more than the number of ones in 1000. Accordingly, in the ranking based on the number of ones, 011 is ranked after the value 1000. The data mining system 108 uses this ranking to select the next intersection set to process after a particular intersection set is processed.

FIG. 4B shows an example of a truth table 402 generated by the database engine 116 for the input sets of data A, B, and C. As shown in FIG. 4B, the truth table 402 includes 8 separate entries 404 for the various combinations of the sets of data A, B, and C. For example, the entry for the combination 6 corresponds to an intersection of the sets of data A and B. This is so because the binary representation of value 6 is 110. The second position corresponding to set B and the third position corresponding to set A are both 1 indicating that sets B and A are included in this combination. Furthermore, the first bit position is 0, indicating that the set C is not included in this combination.

As another example, entry for the combination 3 corresponds to an intersection of the sets of data B and C. This is so because the binary representation of value 3 is 011. The first position corresponding to set C and the second position corresponding to set B are both 1 indicating that sets C and B are included in this combination. Furthermore, the third bit position is 0, indicating that the set A is not included in this combination.

Following generation of the truth table, the entries of the truth table are sorted 320 in ascending order based on the number of "trues" (or ones) in the combinations corresponding to the entries. For example, FIG. 4B shows the truth table in an unsorted state (or in order of the binary value of each entry). Illustratively, the combination 4 in the truth table 402 is listed after the entry for the combination 3. In contrast, the FIG. 4C, shows the truth table 402 after sorting based on the number of "trues" (or ones) in the combinations corresponding to the entries. In particular, the entry for the combination 4 in the truth table 402 is sorted ahead of the entry for the combination 3 because the combination 4 includes 1 set of data (i.e., the set of data A) while the combination 3 includes 2 sets of data (i.e., the sets of data B and C). The database engine 116 of the columnar database management system 112 additionally retrieves 322 the sets of data indicated by the data mining request. For example, the database engine 116 may retrieve the sets of data A, B, and C from the data 114.

Thereafter, for each non-calculated entry in the truth table and in ascending order by number of "trues," the database engine 116 determines 325 an intersection set based on those sets of data marked as true in the combination of the non-calculated entry of the truth table. As used herein, a non-calculated entry may refer to an entry for which the intersection set or a cardinality (number of elements) of the intersection set has not yet been determined. For example, with reference to FIG. 4C, the first non-calculated entry in ascending order in the truth table 402 is the entry for the combination 1. Thus, the database engine 116 determines the intersection set for the set C. As shown in FIG. 4C, the determined intersection set includes all the elements of the set C because the combination 1 only includes the set C.

After determining the intersection set for the combination of the non-calculated entry, the database engine 116 determines 330 the cardinality of the intersection set, and records the determined cardinality as a partial result in the non-calculated entry. Referring again to FIG. 4C, the set of data C may include 8 elements. Thus, the cardinality of the intersection set for the combination 1 is equal to 8 (i.e., all the elements in the set of data C). Hence, 8 is recorded as the "partial result" in the entry corresponding to the combination 1.

After recording the cardinality as the partial result, the database engine 116 marks the entry as having been calculated. The entry is additionally marked as including the "current combination." Thereafter, in ascending order and for each non-calculated entry including a combination higher than the current combination, the database engine 116 determines 335 whether the higher combination indicated by the entry includes at least the same sets as the current combination. For example, referring to FIG. 4D, the database engine 116 identifies the next entry, in ascending order, for a combination that includes the set C. As such, the database engine 116 identifies the entry for the combination 3.

If it is determined that the higher combination contains at least one set that overlaps with the current combination, the database engine 116 repeats steps 325, 330, and 335 for the non-calculated entry including the higher combination. For example, referring to FIG. 4D, the database engine 116 determines the intersection set between the set of data B and set of data C. In FIG. 4D, the intersection set includes 6 elements. After determining that the intersection set includes 6 elements, the database engine 116 records 6 for the partial result for the combination 3. The entry including the combination 3 is then set as the current combination. Now referring to FIG. 4E, the database engine 116 identifies the next non-calculated entry for a higher combination that includes the sets of data B and C, which is the entry for the combination 7. Thus, the database engine 116 determines the intersection set between the sets of data A, B, and C. In FIG. 4E, the database engine 116 determines that the intersection set includes 3 elements, and records 3 as the partial result for the combination 7.

With continued reference to the example, since there are no remaining non-calculated entries for combinations that include the sets of data A, B, and C, the database engine 116 processes the next non-calculated entry in ascending order in the truth table. For example, referring to FIG. 4F, the database engine 116 identifies that the entry for the combination 2 as not having been calculated. Thus, the database engine 116 determines the intersection set for the combination 2, which includes all of the elements in set of data B. Hence, the database engine 116 records, as a partial result, 10 for the combination 2. Thereafter, the database engine 116 identifies and processes other non-calculated entries for higher combinations including the set of data B. Finally, the database engine 116 identifies and processes any non-calculated entries for combinations including the set of data A. Referring now to FIG. 4G, it shows the truth table 402 with each of the partial results for each combination recorded.

Once the intersection sets for all combinations are determined, the data mining system 108 determines the subsets of the Venn diagram based on the intersection sets. The data mining system 108 determines a subset of the Venn diagram as a set difference of an intersection set and one or more subsets of the Venn diagram that were previously computed. In an embodiment, the data mining system 108 determines a cardinality of each subset of the Venn diagram as a difference of a cardinality of a first intersection set and cardinality of subsets of the Venn diagram that were previously computed. The data mining system 108 uses the ranking based on the truth table to determine which subset of the Venn diagram to determine next. As described herein, the truth table ranks the combinations of sets based on the number of input sets in each combination.

The data mining system 108 processes the combinations of sets in decreasing order of the number of input sets of each combination to determine subsets of the Venn diagram.

In an embodiment, the data mining system 108 determines a subset of the Venn diagram as the set difference of intersection sets and previously computed subsets of Venn diagram. In another embodiment, the data mining system 108 determines the cardinality of each subset of the Venn diagram as the difference of cardinality of each intersection set and cardinality of subsets of the Venn diagram that were previously computed.

Accordingly, for each entry in descending order from highest to lowest, final results are calculated 340 based on the partial results for the entry. To calculate the final result for a particular entry, the database engine 116 subtracts the partial value for the particular entry by the final result for each other entry that includes (1) a higher combination than the combination of the particular entry and (2) where the higher combination includes the sets of data of the combination of the particular entry. For example, referring to FIG. 4H, it shows the truth chart 402 following calculation of the final results for each combination. As shown in FIG. 4H, the final result for the entry of combination 3 is calculated by subtracting the partial result for the entry of combination 3 (i.e., 6) by the final result for the entry of combination 7 (i.e., 3). Such a calculation is performed because (1) the combination 7 is higher than the combination 3 and (2) the combination 7 includes the sets of data of the combination 3 (e.g., sets of data B and C). FIG. 4I shows the final truth table generated by the database engine 116.

Figure 4J:
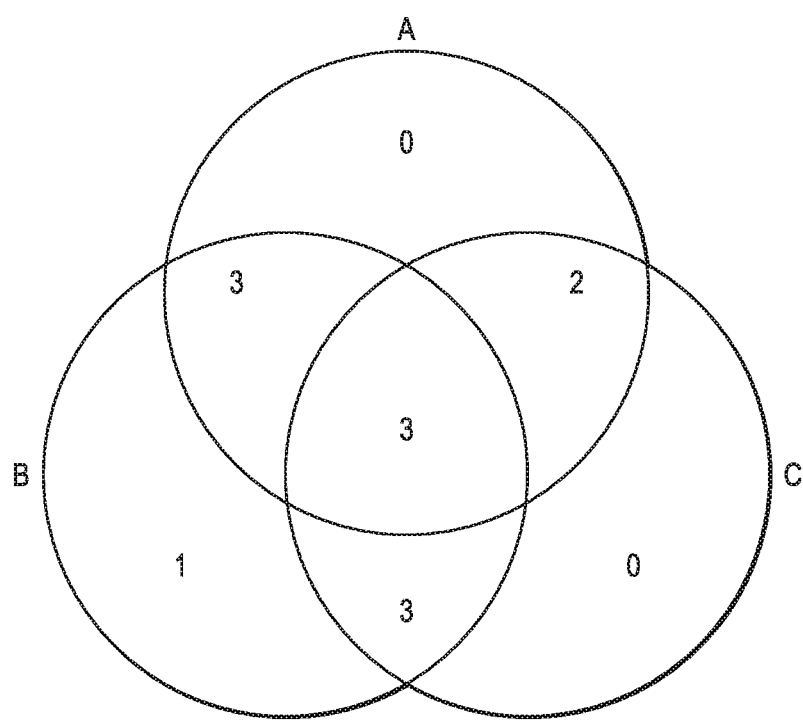

Thereafter, the database engine 116 generates 345 a Venn diagram based on the final results and provides the Venn diagram to the client 105 for presentation to a user. FIG. 4J shows an example of a Venn diagram generated by the database engine 116 and provided to a client 105. Although FIG. 4J shows the cardinality of various subsets of the Venn diagram, other embodiments may show other information describing the various subsets of the Venn diagram, for example, the elements of each subset or an aggregate value determined based on the elements of the subset.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A data mining method, comprising:
receiving, by a columnar database management system from a client device, a data mining request, wherein the data mining request requests generation of a Venn diagram and indicates input data sets for the Venn diagram, the columnar database management system having a database engine;
generating, by the database engine, a truth table based on the input data sets for the Venn diagram, the truth table having multiple entries, where each entry of the multiple entries corresponds to a combination of the input data sets and is associated with a binary value, wherein positions of bits in the binary value correspond to the input data sets, wherein a value of a bit determines whether an input data set, which corresponds to a position of the bit, is included in the combination represented by the binary value;
ranking, by a data mining system, combinations of the input data sets based on a number of ones in each binary value associated with each of the combinations of the input data sets; and
selecting, by the data mining system utilizing the ranking, a next interaction set to process for the Venn diagram after a particular intersection set is processed to thereby determine intersection sets for the Venn diagram in an order that efficiently utilizes the particular intersection set that has been previously processed.

2. The method according to claim 1, further comprising:
determining the value of the bit, wherein, responsive to the value of the bit being determined as zero, the input data set, which corresponds to the position of the bit, is not included in the combination represented by the binary value.

3. The method according to claim 1, wherein the data mining request is received by the columnar database management system directly from the client device or via a frontend application of the data mining system.

4. The method according to claim 1, wherein the columnar database management system is part of the data mining system.

5. The method according to claim 1, wherein the data mining request is encapsulated in a text format.

6. The method according to claim 1, further comprising:
storing the intersection sets processed by the data mining system for the Venn diagram.

7. The method according to claim 1, further comprising:
communicating the intersection sets processed by the data mining system for the Venn diagram to the client device.

8. A data mining system, comprising:
a columnar database management system having:
a processor;
a non-transitory computer-readable medium; and
stored instructions translatable by the processor for:
receiving, from a client device, a data mining request, wherein the data mining request requests generation of a Venn diagram and indicates input data sets for the Venn diagram;
generating a truth table based on the input data sets for the Venn diagram, the truth table having multiple entries, where each entry of the multiple entries corresponds to a combination of the input data sets and is associated with a binary value, wherein positions of bits in the binary value correspond to the input data sets, wherein a value of a bit determines whether an input data set, which corresponds to a position of the bit, is included in the combination represented by the binary value;
ranking combinations of the input data sets based on a number of ones in each binary value associated with each of the combinations of the input data sets; and
selecting, utilizing the ranking, a next interaction set to process for the Venn diagram after a particular intersection set is processed to thereby determine intersection sets for the Venn diagram in an order that efficiently utilizes the particular intersection set that has been previously processed.

9. The data mining system of claim 8, wherein the stored instructions are further translatable by the processor for:
determining the value of the bit, wherein, responsive to the value of the bit being determined as zero, the input data set, which corresponds to the position of the bit, is not included in the combination represented by the binary value.

10. The data mining system of claim 8, further comprising:
a frontend application, wherein the data mining request is received by the columnar database management system directly from the client device or via the frontend application of the data mining system.

11. The data mining system of claim 8, wherein the data mining request is encapsulated in a text format.

12. The data mining system of claim 8, wherein the stored instructions are further translatable by the processor for:
storing the intersection sets processed by the data mining system for the Venn diagram.

13. The data mining system of claim 8, wherein the stored instructions are further translatable by the processor for:
communicating the intersection sets processed by the data mining system for the Venn diagram to the client device.

14. A computer program product for data mining, the computer program product comprising a non-transitory computer-readable medium storing instructions translatable by a processor of a columnar database management system for:
receiving, from a client device, a data mining request, wherein the data mining request requests generation of a Venn diagram and indicates input data sets for the Venn diagram;
generating a truth table based on the input data sets for the Venn diagram, the truth table having multiple entries, where each entry of the multiple entries corresponds to a combination of the input data sets and is associated with a binary value, wherein positions of bits in the binary value correspond to the input data sets, wherein a value of a bit determines whether an input data set, which corresponds to a position of the bit, is included in the combination represented by the binary value;
ranking combinations of the input data sets based on a number of ones in each binary value associated with each of the combinations of the input data sets; and
selecting, utilizing the ranking, a next interaction set to process for the Venn diagram after a particular intersection set is processed to thereby determine intersection sets for the Venn diagram in an order that efficiently utilizes the particular intersection set that has been previously processed.

15. The computer program product of claim 14, wherein the instructions are further translatable by the processor for:
determining the value of the bit, wherein, responsive to the value of the bit being determined as zero, the input data set, which corresponds to the position of the bit, is not included in the combination represented by the binary value.

16. The computer program product of claim 14, wherein the data mining request is received by the columnar database management system directly from the client device or via a frontend application of a data mining system.

17. The computer program product of claim 15, wherein the columnar database management system is part of the data mining system.

18. The computer program product of claim 14, wherein the data mining request is encapsulated in a text format.

19. The computer program product of claim 14, wherein the instructions are further translatable by the processor for:
storing the intersection sets for the Venn diagram.

20. The computer program product of claim 14, wherein the instructions are further translatable by the processor for:
communicating the intersection sets for the Venn diagram to the client device.

* * * * *